(12) United States Patent
Stoops

(10) Patent No.: US 8,727,384 B2
(45) Date of Patent: May 20, 2014

(54) QUICK CONNECT COUPLER WITH DIFFERENTIAL LOCKING

(75) Inventor: Kyle Alden Stoops, Elkhart, IN (US)

(73) Assignee: Elkhart Brass Manufacturing Co., Inc., Elkhart, IN (US)

( * ) Notice: Subject to any disclaimer, the term of this patent is extended or adjusted under 35 U.S.C. 154(b) by 432 days.

(21) Appl. No.: 12/548,969

(22) Filed: Aug. 27, 2009

(65) Prior Publication Data

US 2010/0052310 A1 Mar. 4, 2010

Related U.S. Application Data

(60) Provisional application No. 61/092,178, filed on Aug. 27, 2008.

(51) Int. Cl.
*F16L 37/06* (2006.01)

(52) U.S. Cl.
USPC .......................................... 285/33

(58) Field of Classification Search
USPC ............ 285/33, 360, 98, 147.1–147.3, 148.1, 285/148.2, 148.4, 148.14, 148.15, 148.19, 285/148.21, 268, 269, 276, 281, 361, 396, 285/402, 404, 314, 315, 316, 83, 81; 169/24, 25, 51, 52, 54
See application file for complete search history.

(56) References Cited

U.S. PATENT DOCUMENTS

| 807,417 | A | | 12/1905 | Caskey |
| 827,739 | A | * | 8/1906 | Lingenfelter ................ 285/89 |
| 867,344 | A | * | 10/1907 | Carman ................ 137/616.7 |
| 966,925 | A | | 8/1910 | Kittredge |
| 1,744,367 | A | | 1/1930 | De Loache |
| 1,997,858 | A | * | 4/1935 | Clawson ................ 285/362 |
| 2,204,392 | A | | 6/1940 | Arm |
| 2,230,098 | A | * | 1/1941 | Wurzburger ................ 285/90 |

(Continued)

FOREIGN PATENT DOCUMENTS

| EP | 0547489 | 9/1997 |
| EP | 1409911 | 12/2004 |
| KR | 10-1993-0004482 | 5/1993 |
| KR | 10-2000-0062581 | 10/2000 |

OTHER PUBLICATIONS

PCT Search Report mailed Feb. 3, 2010 for corresponding PCT Application No. PCT/US2009/055157.

*Primary Examiner* — Daniel P. Stodola
*Assistant Examiner* — James Linford
(74) *Attorney, Agent, or Firm* — Faegre Baker Daniels LLP

(57) ABSTRACT

A coupler for coupling a first fluid delivery device to a second fluid delivery device includes a base adapted for mounting at one of the opening of first fluid delivery device, a locking member coupled to the base about the base's longitudinal axis, with the locking member being movable along the base along the base's longitudinal axis between a locking position and an unlocking position. A connector member having a body adapted for releasably mounting at one of the openings of the second fluid delivery device is releasably engageable with the locking member and with the base wherein the fluid flow passageways of the base and the connector member are in fluidic communication. Further, the locking member is biased toward the connector member to thereby engage the connector member with a first force when fluid is flowing through the coupler and with a second lower force when fluid is not flowing through the coupler wherein when no fluid is flowing through the coupler, the connector member may be disconnected from the locking member by simply overcoming the second lower biasing force.

23 Claims, 5 Drawing Sheets

(56) References Cited

U.S. PATENT DOCUMENTS

| | | | | |
|---|---|---|---|---|
| 2,257,321 A | * | 9/1941 | Arnold | 285/67 |
| 2,379,035 A | * | 6/1945 | Phillips | 210/448 |
| 2,818,279 A | | 12/1957 | Knapp | |
| 3,140,072 A | * | 7/1964 | Scinto, Jr. | 251/89.5 |
| 3,383,123 A | * | 5/1968 | Murray | 285/83 |
| 4,071,268 A | | 1/1978 | Halling et al. | |
| 4,688,830 A | | 8/1987 | Meisinger et al. | |
| 7,140,645 B2 | | 11/2006 | Cronley | |

\* cited by examiner

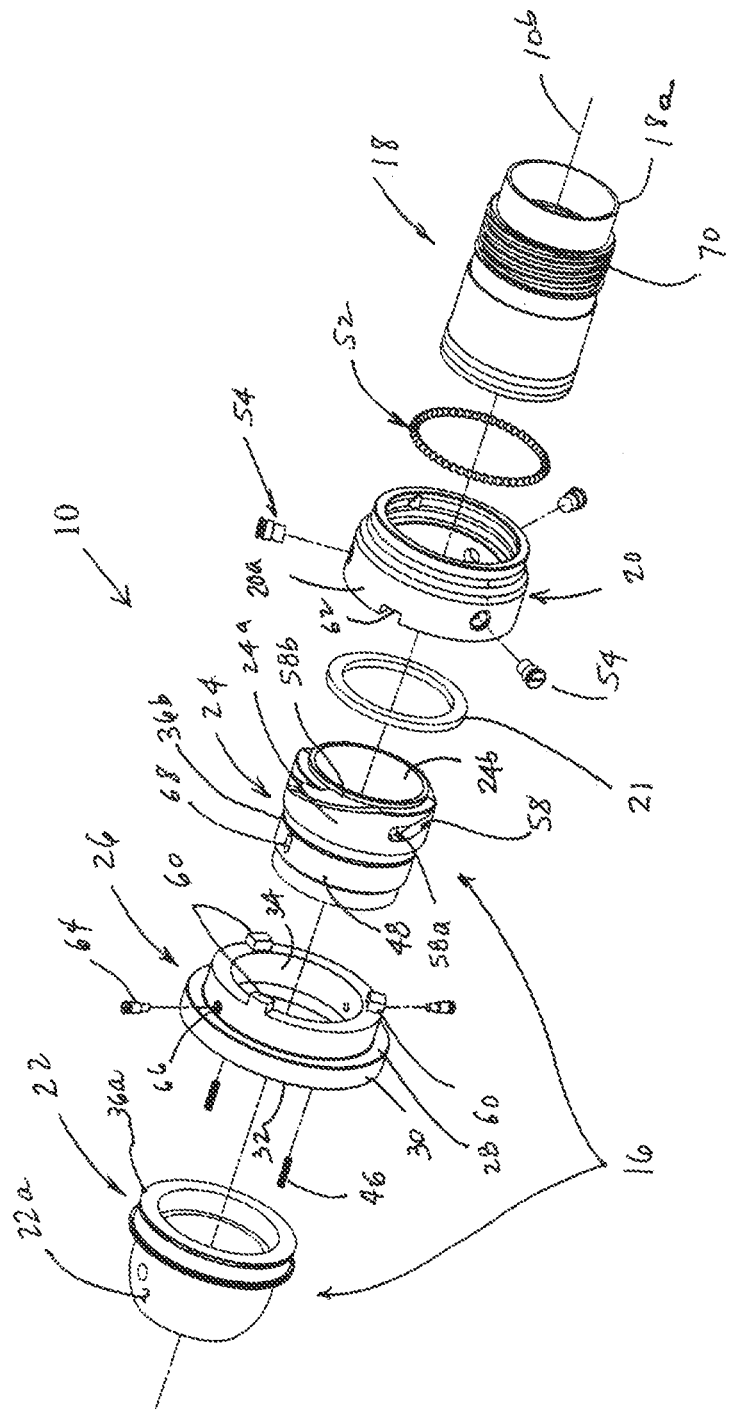

QUICK CONNECT COUPLER WITH DIFFERENTIAL LOCKING

CROSS-REFERENCE TO RELATED APPLICATION

This application claims priority from U.S. Pat. Application Ser. No. 61/092,178, filed Aug. 27, 2008, entitled QUICK CONNECT COUPLER, by Applicant Kyle Alden Stoops, which is incorporated by referenced herein in its entirety.

TECHNICAL FIELD AND BACKGROUND OF THE INVENTION

The present invention relates to a coupler and, more particularly, to a coupler for connecting fluid delivery components together, including for example fire fighting fluid delivery devices.

During the course of fighting a fire, it may be necessary to change a nozzle or change a supply hose. For example, a firefighter may need to change the nozzle on a monitor or a nozzle on a hose, or to change a supply hose to the monitor or to the nozzle. During a fire, such changes must be made quickly. However, when dealing with a fire, fluid is typically delivered at relatively high pressure in which case it is essential that the coupling remains locked when under pressure.

Accordingly, there is a need for a coupling that is secure and locked when in use so as to be suitable for high pressure applications but which provides a quick disconnect or connect to allow a quick change of components without compromising the security of the connection.

SUMMARY OF THE INVENTION

Accordingly, the present invention provides a coupler that provides a quick disconnect/connect between fluid delivery components, such as between hoses and monitors, hoses and nozzles, and nozzles and monitors, or the like.

In one form of the invention, a coupler for coupling a first fluid delivery device to a second fluid delivery device includes a base, which is adapted for mounting at one of the openings of the first delivery device. A locking member is coupled to the base about the longitudinal axis of the base and extends around the base and, further, is movable along the base along the longitudinal axis of the base between a locking position and an unlocking position. A connector member, with a body that is adapted for releasably mounting at one of the openings of the second fluid delivery device and has a fluid flow passageway extending therethrough, is releasably engageable with the locking member and with the base wherein the fluid flow passageways of the base and the connector member are in fluidic communication. In addition, defined between the base and the locking member is a chamber, with the base having a fluid passage extending from its fluid flow passageway to the chamber to redirect a portion of the fluid flowing through the coupler to thereby pressurize the chamber. The pressure in the chamber is then applied to the locking member to urge the locking member toward the locking position and to engage the connector member to thereby lock the connector member about the base. In this manner, when fluid is flowing through the coupler, the disconnection function is essentially disabled and only enabled when fluid flow through the coupler has stopped.

In one aspect, the locking member comprises an annular member.

In another aspect, the connector member rotatably engages the base. For example, the connector member may include a rod that rotatably engages the base, which has a cam groove into which the rod extends to rotatably engage the base.

Alternately, the connector member may rotatably engage the base with a threaded connection.

According to another aspect, the locking member includes at least one projecting structure, and the connecting member has at least one recess, with the projecting structure extending into the recess when the locking member is moved to its locked position. For example, the projecting structure may comprise a projecting tab.

In another aspect, the connector member comprises an annular member. Further, the connector member may also include a tubular member that extends from the annular member and which is rotatably mounted to the annular member.

In yet other aspects, the locking member is biased toward the locked position by at least one spring. When the chamber is not pressurized by fluid redirected from the fluid passageway of the base, the locking member is, therefore, movable from the locked position to its unlocked position when a force sufficient to compress the spring is applied to the locking member. For example, the spring may comprise a coil spring interposed between the base and the locking member. It should be understood that when the chamber is pressurized, the locking member is not easily moved to its unlocked position because the force needed to move the locking member would need to not only compress the spring but also compress the fluid or force the fluid back through the passage in the base, which force may be prohibitively high, and thus the locking member is effectively locked in its locked position.

Accordingly to yet another aspect, the base comprises a first body and a second body, with the first body adapted for mounting at the one of the openings of the first fluid delivery device and the second body mounted to the first body and being releasably engaged by the connector member. For example, the first body may have a curved outer surface to form a pivotal connection at the opening of the first fluid delivery device. Further, the first body may comprise a generally spherical body.

In yet other aspects, the coupler is in combination with the first and second fire fighting fluid delivery devices. For example, the coupler may releasably mount the inlet opening of the second fire fighting fluid delivery device to the discharge opening of the first fighting fluid delivery device.

Further, the first fighting fluid delivery device may comprise a monitor, and the second fighting fluid delivery device may comprise a nozzle or a hose, with the coupler releasably mounting the nozzle or hose to the monitor.

In accordance with another form of the invention, a method of locking a quick connect coupler, which couples a first fluid delivery device to a second fluid delivery device, includes providing a quick connect coupler, with a first part and a second part, with each of the parts having a fluid passageway extending therethrough. The first part is mounted to the first fluid delivery device, and the second part is mounted to the second fluid delivery device. The second part is coupled to the first part to thereby mount the second fluid delivery device to the first fluid delivery device and wherein the fluid passageways of the first and second parts are in fluidic communication. When fluid is flowed through the first fluid delivery device, the coupler, and the second fluid delivery device, a portion of the fluid pressure is used to lock the first part and the second part together.

Accordingly, the present invention provides a quick connect coupler that uses a hydraulic locking mechanism that is powered by the fluid flowing through the two components connected together by the coupler to prevent disconnection while fluid is flowing through the coupler but allows disconnection when the fluid flow is stopped.

These and other objects, advantages, purposes, and features of the invention will become more apparent from the study of the following description taken in conjunction with the drawings.

DESCRIPTION OF THE FIGURES

FIG. 3 is an exploded perspective view of the quick connect coupler;

DESCRIPTION OF THE PREFERRED EMBODIMENTS

Figure 1:
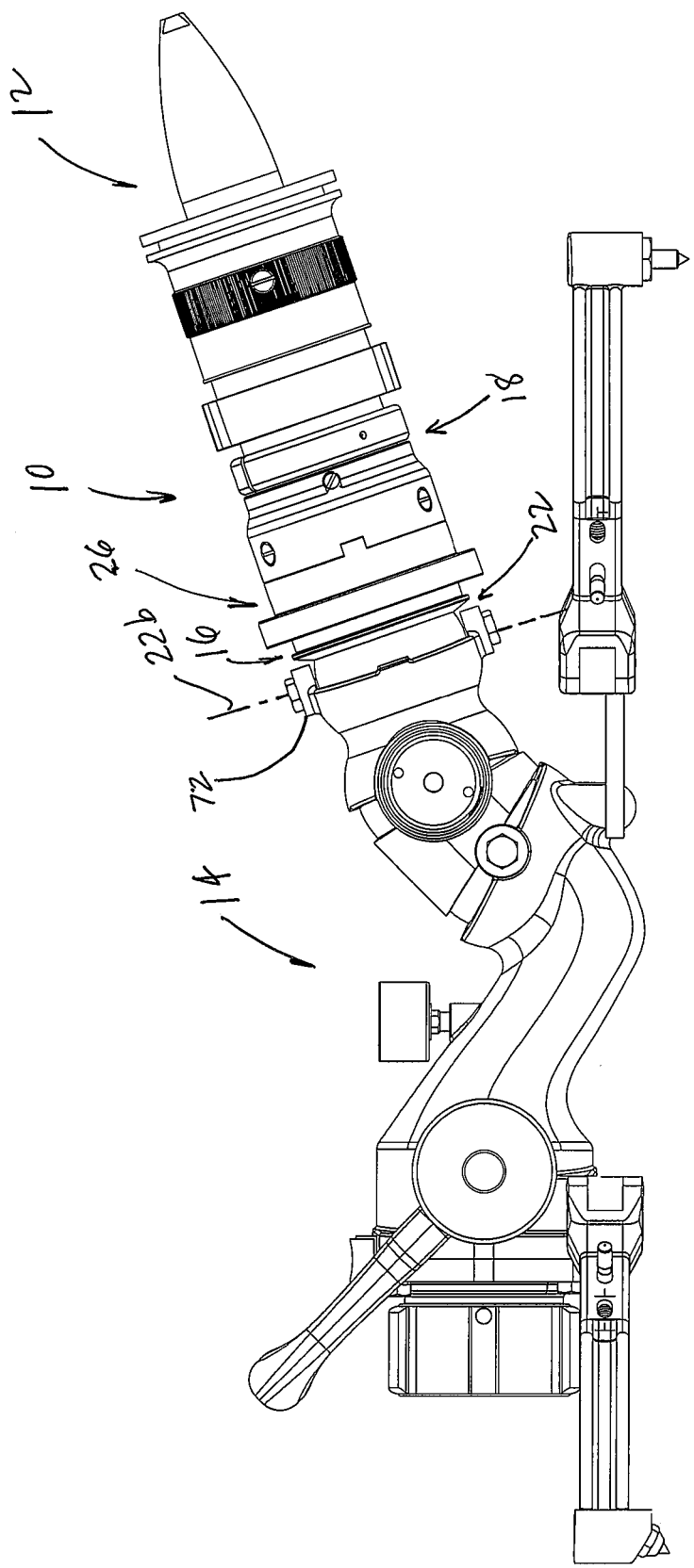
FIG. 1 is a side elevation view of a monitor incorporating a quick connect coupler of the present invention.

Referring to FIG. 1, the numeral 10 generally designates a quick connect coupler of the present invention for coupling a first fluid delivery component or device to a second fluid delivery component or device. While the following description makes reference to the quick connect coupler mounting a nozzle 12 to the discharge outlet of a monitor 14, it should be understood that quick connect coupler 10 may provide a coupling between other fluid delivery components or devices, such as hoses, wyes, stand pipes, pumps, or the like. Furthermore, although described in reference to the coupler being mounted to the discharge portion of monitor 14, it should be understood that the coupler may be mounted to the inlet of the monitor or of other fluid delivery devices. As will be more fully described below, quick connect coupler 10 incorporates a hydraulic lock mechanism to assure that the coupler is locked when fluid is flowing through the coupler but which allows a portion of the coupler to be quickly and easily disconnected when fluid flow has stopped.

Figure 2:
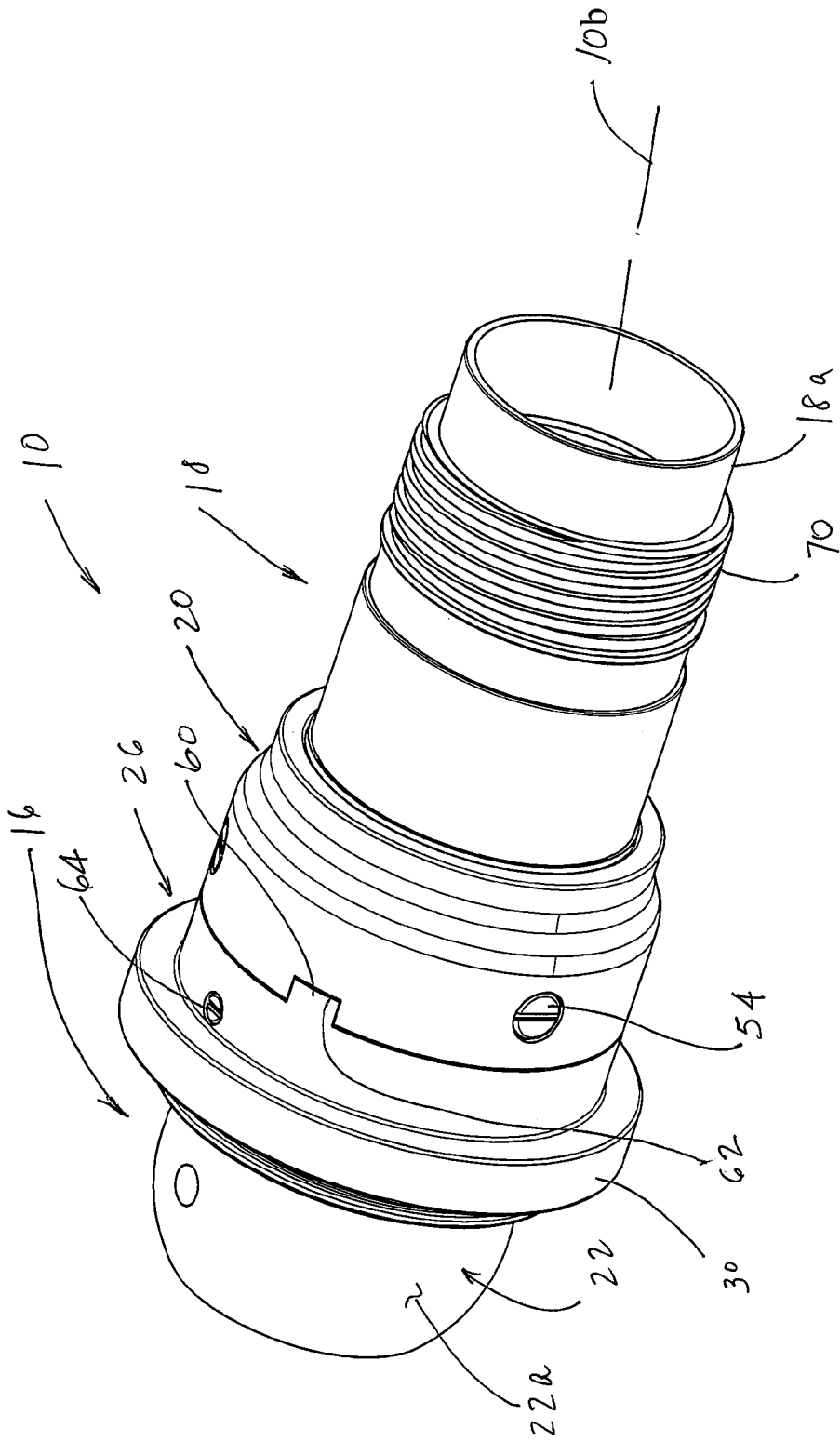
FIG. 2 is a large perspective view of the quick connect coupler.

Referring to FIGS. 2 and 3, coupler 10 includes a base 16 and an inlet body 18, which is mounted to the base by an annular member 20, which forms a swivel connection for the inlet body and which seals the inlet body 18 against base 16 with a gasket 21 interposed between inlet body 18 and base 16. Base 16 includes a discharge body 22 and an adapter 24, which is threaded into discharge body 22 by a threaded connection 25 to thereby rotatably couple adapter 24 to body 22. Mounted about base 16 is a locking ring 26 that is rotatably coupled to base 16 so that locking ring 26 is fixed relative to the base about the base's longitudinal axis when fluid is flowing through the base but is movable along the base's longitudinal axis when fluid is not flowing through coupler 10. As will be described in further detail, locking ring 26 interlocks with annular member 20 when fluid is flowing through the coupler but is adapted to be releasable from engagement therewith when fluid flow has essentially stopped to allow annular member 20 and inlet body 18 to be disconnected from base 16.

In the illustrated embodiment, locking ring 26 comprises an annular collar 28 with an enlarged flange 30, which provides a surface for a user to apply a force on the locking ring to move the locking ring relative to base 16 and to disengage from annular member 20 when fluid is not flowing through the coupler. Locking ring 26 includes an inlet end 32 for receiving discharge body 22 and, further, a transverse passage 34 in which adapter 24 is mounted and extends to couple to base 22. Locking ring 26 is sealed against body 22 and adapter 24 by one or more seals 36a, 36b, such as o-ring seals. Adapter 24 has a generally cylindrical-shaped body with a portion of its outer surface with an outer diameter that is generally commensurate in size to the inner diameter of annular collar 28 of locking ring 26, which includes a shoulder 40 that spaces flange 30 radially outward from adapter 24 to thereby form a chamber 42 (FIG. 5) between locking ring 26 and base 16, which will be more fully described below. Furthermore, shoulder 40 includes two or more recesses 44 (FIG. 6) for retaining springs 46, which are interposed between discharge body 22 and locking ring 26 to thereby bias locking ring 26 toward annular member 20, when mounted on adapter 24 which will be more fully described below. For example, springs may comprise coil springs or the like.

Figure 5:
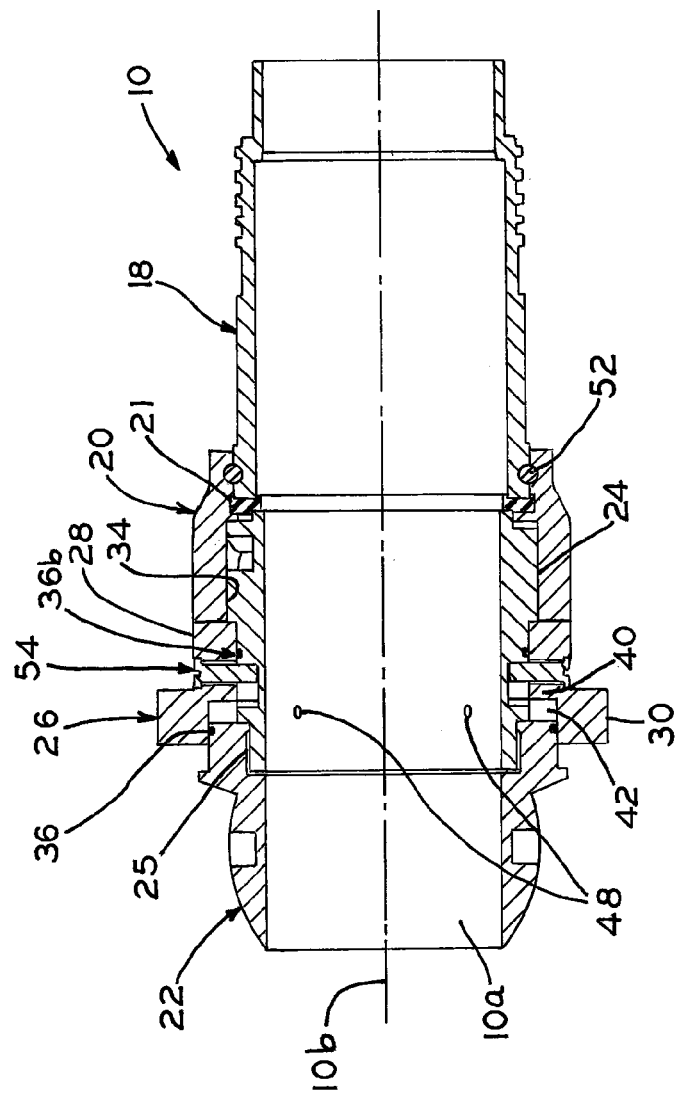
FIG. 5 is a cross-sectional view taken along line V-V of FIG. 4.

As best seen in FIGS. 3 and 5, adapter 24 includes one or more transverse passages 48, which extend through the annular wall 24a of adapter 24 and, further, aligned with chamber 42, which provide fluid communication between chamber 42 and the fluid flow passageway of coupler 10 to allow fluid flowing through passageway 10a of coupler 10 to be diverted into the chamber 42 to create hydraulic pressure in chamber 42, which also biases or urges locking ring 26 toward annular member 20, again more fully described below.

Figure 6:
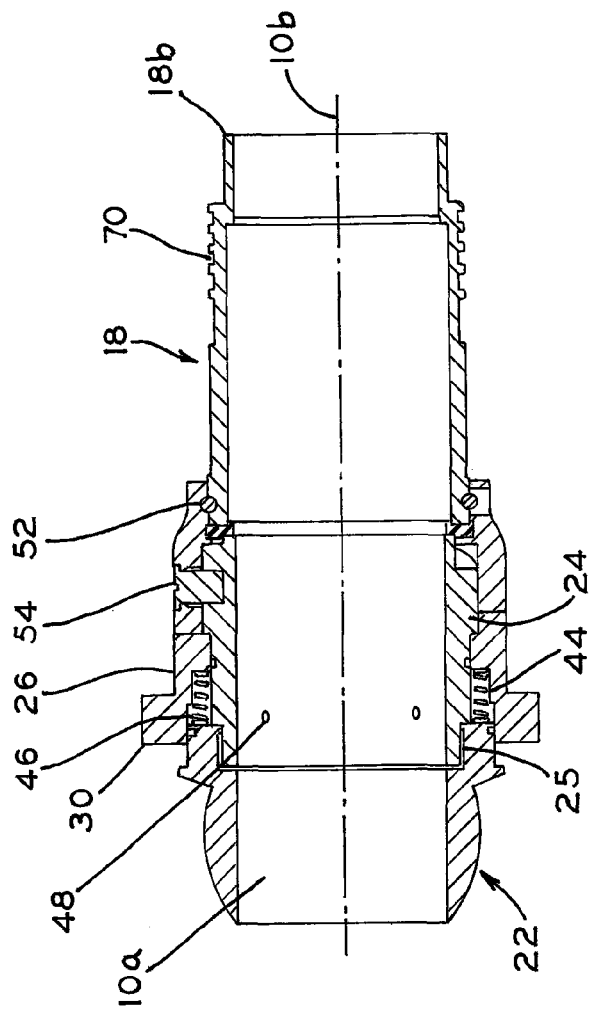
FIG. 6 is a cross-sectional view taken along line VI-VI of FIG. 4.
Figure 4:
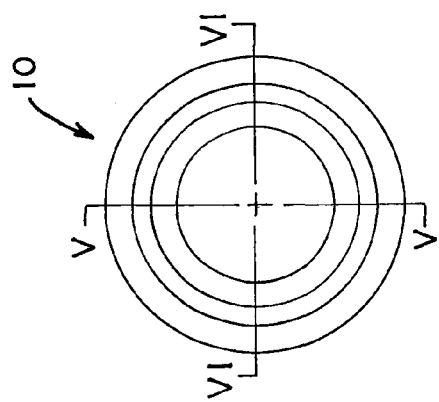
FIG. 4 is an end elevation view of the quick connect coupler.

Referring to FIG. 6, annular member 20 is mounted about inlet body 18 by a low friction connection 52. In the illustrated embodiment, low friction connection 52 comprises a plurality of ball bearings, which are housed in raceways formed in the outer surface of inlet body 18 and on the inner surface of annular member 20. In this manner, inlet body 18 may be rotated in annular member 20, which facilitates mounting of the nozzle or other fluid delivery devices to coupler 10. It should be understood that inlet body 18 may be joined with annular member 20 by a fixed connection, such as welding, or can be formed with annular member 20 so that inlet body 18 and annular member 20 form a unitary member.

As best seen in FIGS. 3 and 6, annular member 20 supports a plurality of cam screws 54, which extend through the annular wall 20a of annular member 20 and into a corresponding plurality of cam slots 58 formed on the outer surface of annular wall 24a of adapter 24. In this manner, when annular member 20 is rotated about longitudinal axis 10b, cam screws 54 will be guided along cam slots 58 between a fully locked position in which cam screws 54 are located at the distal ends 58a of the respective cam slots 58 and to an unlocked position when cam screws 54 are aligned with the open end 58b of the cam slots, which are located around the discharge end 24b of adapter 24 to allow annular member 20 to be disconnected from base 16 to thereby provide a quick disconnect of the annular member 20 and inlet body 18 from base 16.

In order to lock the rotation of annular member 20 relative about axis 10b, locking ring 26 includes a plurality of projecting members 60, which are extendable into corresponding recesses 62 formed on annular member 20. Further, to fix the rotational position of locking ring 26 relative to adapter 24, locking ring 26 includes a plurality of locking screws 64, which extend through apertures 66 in the annular wall of locking ring 26 and into corresponding slotted openings 68 formed in adapter 24. In this manner, locking ring 26 and adapter 24 are rotatably coupled together about longitudinal axis 10b but with locking ring 26 movable relative to adapter 24 along longitudinal axis 10b so that locking ring 26 can be moved between an unlocked position and a locking position (see FIG. 2) where members 60 extend into recesses 62. When projecting members 60 extend into recesses 62, annular member 20 and inlet body 18 are therefore locked relative to locking ring 26 and, in turn, relative to base 16. Once locked, therefore, annular member 20 cannot disconnect from base 16. In the illustrated embodiment, projecting members 60 comprise rectangular tabs, which extend into corresponding rectangular slots 62, which thereby fix the rotational position of annular member 20 and inlet body 16 when the respective tabs are inserted into their respective recesses.

Referring again to FIG. 5, when fluid flow through the fluid delivery device, for example, monitor 14 is terminated, locking ring 26 may be unlocked from annular member 20 by simply applying a force on locking ring 26 that is sufficient to overcome the biasing force of springs 46. However, when water is flowing through the fluid delivery device and through coupler 10, the hydraulic pressure exerted on locking ring 26 from the fluid pressure in chamber 42 will increase the force required to move the locking ring 26 to disconnect it from annular member 20 and optionally increase the force that is of a magnitude that cannot be overcome manually. Therefore, the coupler of the present invention provides a quick disconnect device that will be locked against disconnection when fluid is flowing through the coupler but which is quickly and easily disconnected when fluid is not flowing or flowing at a low rate through the coupler. It should be understood that the size of the force generated by the pressure in chamber 42 is a function of the surface area of shoulder 40, which may be increased or decreased as desired. Ideally, the size of shoulder 40 is such that the coupler can not be disconnected when fluid is flowing through the coupler and can only be disconnected when essentially all fluid flow as stopped.

Referring again to FIG. 2, inlet body 18 includes a threaded portion 70 at its outlet or discharge end 18a to facilitate coupling of a variety of nozzles, such as illustrated in FIG. 1, to coupler 10. As noted above, however, it should be understood that coupler 10 may be used on the inlet end of the monitor or other fluid delivery devices, with the inlet body being adapted to couple a hose, for example, to the fluid delivery device.

In addition, discharge body 22 may be adapted to provide a pivot joint and, therefore, may have an arcuate outer surface 22a (FIG. 3) so that coupler may also provide an articulatable connection for the respective fluid delivery device. In the illustrated embodiment, arcuate surface 22a provides articulation about a generally vertical axis 22b through pivot bolts 72, which extend into corresponding recesses formed in body 22 to thereby form a pivot joint. However, it should be understood that body 22 may be configured to provide articulation about a horizontal axis or multiple axes as well.

While one form of the invention has been shown and described, other changes and modifications will be appreciated by those skilled in the relevant art. While the invention has been described in reference to a fire fighting fluid delivery device, it should be understood that the invention may also be used in other fluid applications, especially in other high pressure fluid applications. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property right or privilege is claimed are defined as follows:

1. A coupler for coupling a first fluid delivery device to a second fluid delivery device, the first fluid delivery device having an inlet opening and a discharge opening, the second fluid delivery device having an inlet opening and a discharge opening, said coupler comprising:
   a base adapted for mounting at one of the openings of the first fluid delivery device, said base having:
      a fluid flow passageway extending therethrough along a longitudinal axis, and
      an annular mounting surface comprising a base shoulder;
   a locking member moveably coupled to said annular mounting surface of said base about said longitudinal axis, said locking member having a locking member shoulder facing said base shoulder to define a fluid chamber in fluid communication with said fluid flow passageway of said base,
      said locking member extending around said base and being movable along said base through a predetermined range of motion along said longitudinal axis such that said fluid chamber is longitudinally expanded and contracted as said locking member shoulder advances away from and toward said base shoulder respectively,
      said locking member defining a locking position at one end of said predetermined range of motion when said fluid chamber is longitudinally expanded and an unlocking position at an opposing end of said predetermined range of motion when said fluid chamber is longitudinally contracted;
   a connector member having a body adapted for releasably mounting at one of the openings of the second fluid delivery device, said body having a fluid flow passageway extending therethrough, and
      said connector member releasably received on said base such that said locking member is disposed between said connector member and said base shoulder,
      said connector member engaged with said locking member when said locking member is in said locking position, such that said connector member is fixed to said base and said locking member when said locking member is in said locking position and moveable with respect to said base when said locking member is moved toward said unlocking position;
   said locking member and said connector member lock together with a first locking force when a fluid flows through said coupler and into said chamber, the fluid biasing said locking member into engagement with said connector member; and
   a biasing element biasing said locking member toward said locking position, such that said locking member and said connector member lock together with a second locking force provided by said biasing member when there is no significant fluid flow through said coupler, said first locking force being greater than said second locking force.

2. The coupler according to claim 1, wherein said locking member comprises an annular member.

3. The coupler according to claim 1, wherein said connector member includes an annular member and said body being mounted to said annular member by a swivel connection, said annular member engaging said base.

4. The coupler according to claim 3, wherein said annular member includes at least one pin, said base having a cam groove, and said pin extending into and rotatably engaging said base in said cam groove.

5. The coupler according to claim 1, wherein said locking member includes at least one projecting structure, and said connector member having at least one recess, said projecting structure extending into said recess when said locking member is moved to said locking position.

6. The coupler according to claim 5 wherein said projecting structure comprises a projecting tab.

7. The coupler according to claim 1, wherein said biasing element comprises at least one spring, said spring generating a spring force, said spring force providing said second locking force.

8. The coupler according to claim 7, wherein said spring comprises a coil spring interposed between said base and said locking member.

9. The coupler according to claim 8, wherein said base comprises a first body and a second body, said first body adapted for mounting at said one of said openings of said first fluid delivery device, and said second body mounted to said first body and being releasably engaged by said connector member.

10. The coupler according to claim 9, wherein said first body has a curved outer surface and is capable of forming a pivotal connection at said one of said openings of said first fluid delivery device.

11. The coupler according to claim 10, wherein said first body comprises a generally spherical body.

12. The coupler according to claim 1, in combination with and coupled to the first fluid delivery device and the second fluid delivery device.

13. The coupler according to claim 12, wherein said coupler releasably mounts said inlet opening of said second fluid delivery device to said discharge opening of said first fluid delivery device.

14. The coupler according to claim 12, wherein said first fluid delivery device comprises a monitor.

15. The coupler according to claim 14, wherein said second fluid delivery device comprises a nozzle, said coupler releasably mounting said nozzle to said monitor.

16. A coupler for coupling a first fluid delivery device to a second fluid delivery device, the first fluid delivery device having an inlet opening and a discharge opening, the second fluid delivery device having an inlet opening and a discharge opening, said coupler comprising:
 a base adapted for mounting at one of the openings of the first fluid delivery device, said base having a fluid flow passageway extending therethrough along a longitudinal axis, said base defining a first shoulder in fluid communication with the fluid flow passageway;
 an annular member moveably mounted to said base and positioned about said base, said annular member having a second shoulder in fluid communication with the fluid flow passageway and opposed to said first shoulder, said annular member being movable along said base through a predetermined range of motion along said longitudinal axis between a locking position and an unlocking position, such that a fluid chamber formed between said first shoulder and said second shoulder is expanded longitudinally when said annular member moves from said unlocking position to said locking position;
 a connector member having a body adapted for releasably mounting at one of the openings of the second fluid delivery device, said body having a fluid flow passageway extending therethrough,
  said connector member releasably received on said base such that said annular member is disposed between said connector member and said first shoulder, and said connector member engaged with said annular member when said annular member is in said locking position, such that said connector member is fixed to said base and said annular member when said annular member is in said locking position and moveable with respect to said base when said annular member is moved toward said unlocking position along said longitudinal axis of said base, wherein said fluid flow passageways are in fluidic communication; and
 a biasing element disposed between said base and said annular member and configured to urge said annular member toward said connector member,
  said annular member being biased toward said connector member with a first biasing force when a fluid is flowing through said coupler and into said fluid chamber, such that the fluid biases the annular member into engagement with said connector member, and
  said annular member being biased toward said connector member by a second biasing force generated by said biasing element, said second biasing force lower than said first biasing force, such that said second biasing force retains said annular member in said locking position when there is no significant fluid flow through said coupler.

17. The coupler according to claim 16, wherein said biasing element comprises a spring generating said second lower biasing force.

18. A coupler for coupling a first fluid delivery device to a second fluid delivery device, the first fluid delivery device having an inlet opening and a discharge opening, the second fluid delivery device having an inlet opening and a discharge opening, said coupler comprising:
 a base adapted for mounting at one of the openings of the first fluid delivery device, said base having a first fluid flow passageway extending therethrough along a longitudinal axis, said base defining a first shoulder in fluid communication with said first fluid flow passageway;
 a locking member coupled to said base about said longitudinal axis, said locking member extending around said base and being movable along said base along said longitudinal axis between a locking position and an unlocking position, said locking member defining a second shoulder in fluid communication with said first fluid flow passageway;
 a connector member having a body adapted for releasably mounting at one of the openings of the second fluid delivery device, said body having a second fluid flow passageway extending therethrough, and said connector member engaged with said locking member when said locking member is in said locking position, such that said connector member is fixed to said base and said locking member when said locking member is in said locking position and moveable with respect to said base when said locking member is in said unlocking position,
 said base and said locking member defining a chamber between said first shoulder and said second shoulder, said chamber expanded longitudinally when said locking member moves from said unlocking position to said locking position, said base having a fluid passage extending from said first fluid flow passageway of said base to said chamber to redirect a portion of the fluid flowing through the coupler when fluid is flowing through the coupler wherein said chamber is pressurized by fluid redirected thereto, and said pressure in said chamber urging said second shoulder away from said first shoulder and thereby applying a first force to said locking member and urging said locking member into engagement with said connector member and to said locking position to thereby lock said connector member to said base; and a biasing element applying a second force biasing said locking member toward said locking position, said second force lower than said first force such that when fluid is not redirected to said chamber, said locking member is movable from said locking position to said unlocking position by applying force sufficient to overcome said second force.

19. The coupler according to claim 18, wherein said biasing element comprises at least one spring, such that when fluid is not redirected to said chamber said locking member is movable from said locking position to said unlocking position by a force sufficient to compress said spring.

20. The coupler according to claim 19, wherein said spring comprises a coil spring interposed between said base and said locking member.

21. The coupler according to claim 20, wherein said base comprises a first body and a second body, said first body adapted for mounting at said one of said openings of said first fluid delivery device, and said second body mounted to said first body and being releasably engaged by said connector member.

22. The coupler according to claim 18, in combination with and coupled to the first fluid delivery device and the second fluid delivery device.

23. The coupler according to claim 22, wherein said coupler releasably mounts said inlet opening of said second fluid delivery device to said discharge opening of said first fluid delivery device.

* * * * *